US008738822B2

(12) United States Patent
Uwais

(10) Patent No.: US 8,738,822 B2
(45) Date of Patent: May 27, 2014

(54) SYSTEM AND METHOD FOR CONTROLLING OPERATION OF A COMPONENT ON A COMPUTER SYSTEM

(75) Inventor: Mohamed Shamil Uwais, Reading (GB)

(73) Assignee: Flexera Software LLC, Schaumburg, IL (US)

( * ) Notice: Subject to any disclaimer, the term of this patent is extended or adjusted under 35 U.S.C. 154(b) by 581 days.

(21) Appl. No.: 11/121,506

(22) Filed: May 3, 2005

(65) Prior Publication Data

US 2006/0253554 A1 Nov. 9, 2006

(51) Int. Cl.
*G06F 3/00* (2006.01)
*G06F 3/06* (2006.01)

(52) U.S. Cl.
CPC .................................. *G06F 3/0689* (2013.01)
USPC .......................................................... 710/36

(58) Field of Classification Search
None
See application file for complete search history.

(56) References Cited

U.S. PATENT DOCUMENTS

| 4,263,649 | A | 4/1981 | Lapp, Jr. |
| 4,471,163 | A | 9/1984 | Donald et al. |
| 4,486,828 | A | 12/1984 | Kitamura et al. |
| 4,956,770 | A | 9/1990 | Johnson et al. |
| 6,891,810 | B2 * | 5/2005 | Struhsaker et al. ........... 370/294 |
| 7,379,918 | B2 * | 5/2008 | Tan et al. ......................... 705/59 |
| 2004/0177168 | A1 * | 9/2004 | Alabraba et al. .................. 710/1 |
| 2005/0160395 | A1 * | 7/2005 | Hughes .......................... 717/102 |

FOREIGN PATENT DOCUMENTS

EP 1 469 369 A2 10/2004

OTHER PUBLICATIONS

International Search Report for PCT/US06/15832 mailed Aug. 6, 2007, 1 page.

* cited by examiner

*Primary Examiner* — Henry Tsai
*Assistant Examiner* — Aurangzeb Hassan
(74) *Attorney, Agent, or Firm* — Michael A. Glenn; Perkins Coie LLP

(57) ABSTRACT

The present invention provides a system and method for generating a control identity for binding together a component and a computer system including hardware devices and software applications. The binding system comprises a processor, a validator module for controlling the processor to generate the control identity, and a store for storing the control identity. The validator module is arranged to define a binding configuration for the component, representing a weighted combination of at least one of a set of hardware elements and a set of software elements needed within the computer system for operation of the component, the validator module also being arranged to prompt the processor to establish whether instances of the elements within the at least one set of elements are present in the computer system. The validator module assigns to each category of element that is established to be present an identity value and adds the identity value to data representing the binding configuration to define the control identity. The validator module then causes the control identity to be transferred to the store.

18 Claims, 8 Drawing Sheets

(Reset)

US 8,738,822 B2

SYSTEM AND METHOD FOR CONTROLLING OPERATION OF A COMPONENT ON A COMPUTER SYSTEM

FIELD OF THE INVENTION

The present invention relates to a system and a method for controlling the operation of a component in a computer system. In particular, the invention relates to a system and a method for controlling authorization of a component to operate in a computer system having tolerance for changes. The component may be a software component or a hardware component.

BACKGROUND OF THE INVENTION

The use of a given software application or computer program in a computer system is generally managed under license, with the license allocating particular rights of use to a specific computer system. However, occasions of illegal use of software applications and computer programs are common, and there exists a significant problem over monitoring the authorized use of a software application or computer program in a computer system, particularly in a computer system in which the software applications and/or hardware devices are subject to change over time.

EP-1469369 discloses a system for generating a hardware identification for a given computer system for use in controlling the operation of software applications on the computer system in dependence upon the level of change occurring in the hardware of the computer system. When a new software product is initially loaded onto the system, the hardware configuration of the computer system is identified and a hardware identification is generated and stored for future use. This hardware identification takes account of every hardware device within each class of hardware devices in the computer system and generates a corresponding hardware identification representing the instant computer hardware configuration. On subsequent reloading of the software product, for any reason, a new hardware identification is generated in the same manner and the new hardware identification is compared with the initial hardware identification, in order to determine whether or not further use of this software program should be permitted or prevented.

Such a known system has a number of disadvantages, including particularly complexity and lack of versatility. For example, the need to check and identify each and every hardware device within each class of hardware device in the computer system in order to establish the hardware identification renders the process of generating the hardware identification laborious and time consuming. Furthermore, the known system monitors only the hardware within the computer system and takes no account of the software, and this is an inherent limitation.

There is thus a need for a more versatile system for controlling the use of both software and hardware components within a computer system.

SUMMARY OF THE INVENTION

The present invention seeks to overcome the problems of the prior art and to provide a system and method for controlling the operation of a component in a computer system that is versatile and easy to use.

Further, the present invention seeks to provide a system and method for controlling the operation of a component in a computer system, by which a control identity can be rapidly calculated for establishing whether or not a given component may be operated in a particular computer system.

In addition, the present invention seeks to provide a flexible such system, which has the capacity to take into account both changes in hardware devices and changes in software applications within the computer system for determining the viability of running a component within the computer system.

The present invention concerns a system and method for binding a software or hardware component to a particular computer system, preferably on a given platform.

Binding is the concept that ensures that a given component will only be able to operate within the computer system for which rights have been granted. Thus, when a new component is installed in a computer system and license rights are activated, that component will be bound to the specific computer system for which it is installed. The component may be a hardware device or a software application, and the computer system may include, for example, a desktop computer, a laptop computer, a server computer, a cell phone or a personal digital assistant (PDA).

According to one aspect of the present invention, there is provided a system for generating a control identity for binding together a component and a computer system including hardware devices and software applications, said binding system comprising:
  a processor;
  a validator module for controlling said processor to generate said control identity; and
  a store for storing said control identity;
  wherein said validator module is arranged to define a binding configuration for said component, said binding configuration representing a weighted combination of at least one of a set of hardware elements and a set of software elements needed within said computer system for operation of said component, and is arranged to prompt said processor to establish whether instances of the elements within said at least one set of elements are present in said computer system;
  wherein said validator module assigns to each category of element that is established to be present an identity value and adds said identity value to data representing said binding configuration to define said control identity; and
  wherein said validator module causes said control identity to be transferred to said store.

According to another aspect of the present invention, there is provided computer readable medium bearing a program for generating a control identity for binding together a component and a computer system including hardware devices and software applications, said program comprising:
  code for defining a binding configuration for said component, said binding configuration representing a weighted combination of at least one of a set of hardware elements and a set of software elements needed within said computer system for operation of said component;
  code for establishing whether instances of the elements within said at least one set of elements are present in said computer system;
  code for assigning to each category of element that is established to be present an identity value;
  code for adding each identity value to data representing said binding configuration to define said control identity; and
  code for causing said control identity to be transferred to said store.

According to a further aspect of the present invention, there is provided method for generating a control identity for binding together a component and a computer system including hardware devices and software applications, said method comprising:

defining a binding configuration for said component, said binding configuration representing a weighted combination of at least one of a set of hardware elements and a set of software elements needed within said computer system for operation of said component;

establishing whether instances of the elements within said at least one set of elements are present in said computer system;

assigning to each category of element that is established to be present an identity value;

adding said identity value to data representing said binding configuration to define said control identity; and storing said control identity.

BRIEF DESCRIPTION OF THE DRAWINGS

The present invention will be described further, by way of example, with reference to the accompanying drawings showing the preferred embodiments, in which.

DETAILED DESCRIPTION OF THE INVENTION

Figure 1:
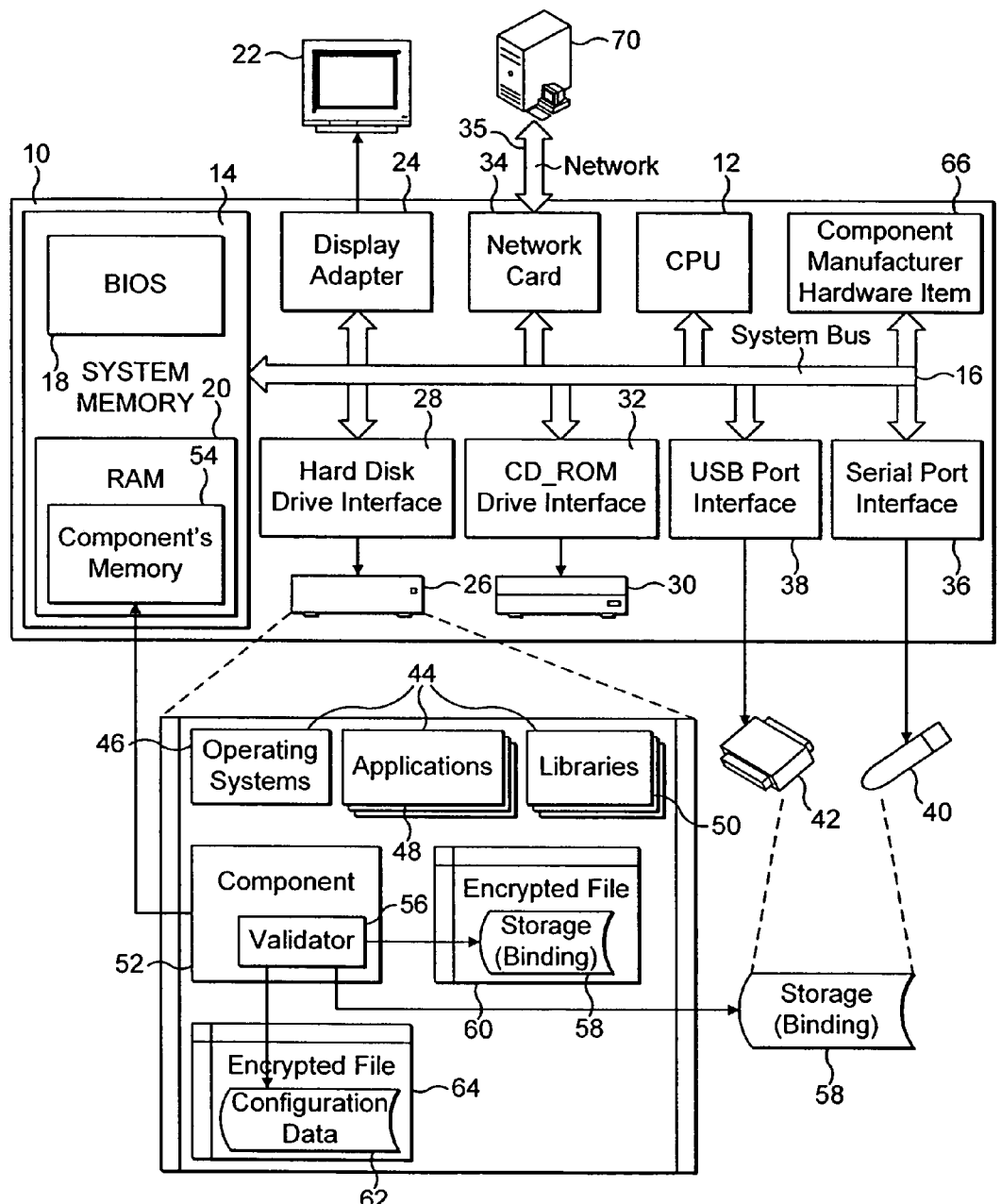
FIG. 1 is a block diagram of a computer system embodying the present invention.

The invention will now be described with reference to an embodiment shown in the drawings. It is to be understood that the described embodiment is illustrative only, and that various modifications are possible, some of which will be mentioned in the following description.

Referring initially to FIG. 1, a computer system embodying the present invention comprises a computer 10 typically including a central processing unit (CPU) 12, a system memory 14 and a system bus 16 for coupling the various devices of the computer 10, including the system memory 14, to the CPU 12. The system memory may include a basic input/output system (BIOS) 18 containing the basic routines for transferring information between elements within the computer 10, and a random access memory (RAM) 20.

In addition, the computer system of FIG. 1 includes a display 22 connected to the system bus 16 by way of a display adaptor 24. It is assumed in the present description that the computer system is in the form of a personal desktop computer and hence the display 22 is shown as a separate item from the computer 10. However, it would be equally possible for the computer system to be in the form of a laptop computer, a cell phone or a personal digital assistant (PDA), and for the display 22 to be integrally included within the computer 10. Alternatively, the computer system could include a server computer and the display 22 may be omitted.

The computer system also typically includes a hard disk drive 26 connected to the system bus 16 by way of a hard disk drive interface 28, and an optical disk drive 30, such as a CD ROM drive, connected to the system bus by way of an optical disk drive interface 32. It will be appreciated that other forms of computer readable media devices, such as a floppy disk drive, could also be included in the computer 10.

The computer 10 further includes a network interface card (NIC) 34 for coupling the system bus 16 to an external network 35, such as a local area network (LAN) or a wide area network (WAN). In addition, the computer 10 includes various other interfaces, such as a serial port interface 36 and a universal serial bus (USB) port interface 38 for connecting various other peripheral input and output devices to the system bus 16 of the computer system. Two specific examples of such hardware devices are shown in FIG. 1 as being a dongle 40 connected to the serial port interface 36 and a dongle 42 connected to the USB port interface 38.

The hard disk drive 26 contains various computer application files 44. For example, the files 44 may include an operating system 46, a number of applications 48 and libraries 50 containing, amongst other things, routines for incorporation into new applications of the computer operating system when installed.

According to the present invention, the computer system further includes a validator arrangement for generating a unique control identity (referred to as a machine identity (MID) in the following description) on each occasion that a particular component or application 52 is loaded into the computer system. When the component or application is loaded into the computer system, the system assigns a portion of memory 54 in the system's RAM 20 to be used by the component. More especially, the component 52 contains a validator module 56, and the validator module 56 prompts the CPU 12 when the component 52 is loaded to initiate a validation process that uniquely binds or links the specific component to the particular computer system. This binding is subsequently maintained irrespective of changes in the software and hardware configuration of the computer system within certain tolerances. The validator module 56 achieves this by generating a unique MID combining information derived from the component 52 with information based on the current configuration of the computer system. When the component 52 is subsequently re-loaded, for any reason, the validator module 56 checks whether the configuration of the system remains the same within the given tolerances, and hence whether the MID remains the same, and accordingly determines whether the component 52 may be permitted to run.

In the present embodiment, the validator module 56 comprises a validator program provided within the component 52 and accessible by way of the hard disk drive 26. As shown, the validator module 56 accesses binding configuration data 62 for the component 52 contained in an encrypted file 64 for generating the MID. It is, of course, also possible for the validator program 56 to be incorporated in the hard disk drive 26 on installation of the computer operating system or subsequently. It is also possible for the validator module 56 to be provided as a hardware product rather than as a software program and, in this instance, it is possible that the configuration data 62 could be embedded in the component. In the following description, however, a validator in the form of a software algorithm will be described.

It will also be appreciated that a different MID may be generated for different platforms on the computer system, as described below. However, for any given component there will be a unique MID to identify the computer system for a given platform.

This unique MID is stored, along with other MIDs generated for different platforms, within a secure storage facility 58 for reference on future occasions when the component 52 is reloaded, in order to determine by means of the validator program 56 whether or not to permit the component 52 to run. As shown in FIG. 1, the secure storage facility 58 is a separate unit that can either be contained within an encrypted file 60 and/or be stored in one of the dongles 40, 42. The advantage of employing such a secure storage facility 58 for storing the MID is that this protects the relevant data, and either prevents deletion or at least ensures that potential deletion is detected.

FIG. 1 also shows the computer 10 as containing a hardware card 66, which may optionally be supplied by the manufacturer of the component 52 for use with the component 52. In some circumstances, the hardware card 66 may be required in order for the validator program 56 within the component 52 to be able to operate. In addition, FIG. 1 shows that the computer 10 may have access, by way of the network 35, to a server 70 provided by the manufacturer of the component.

Figure 2:
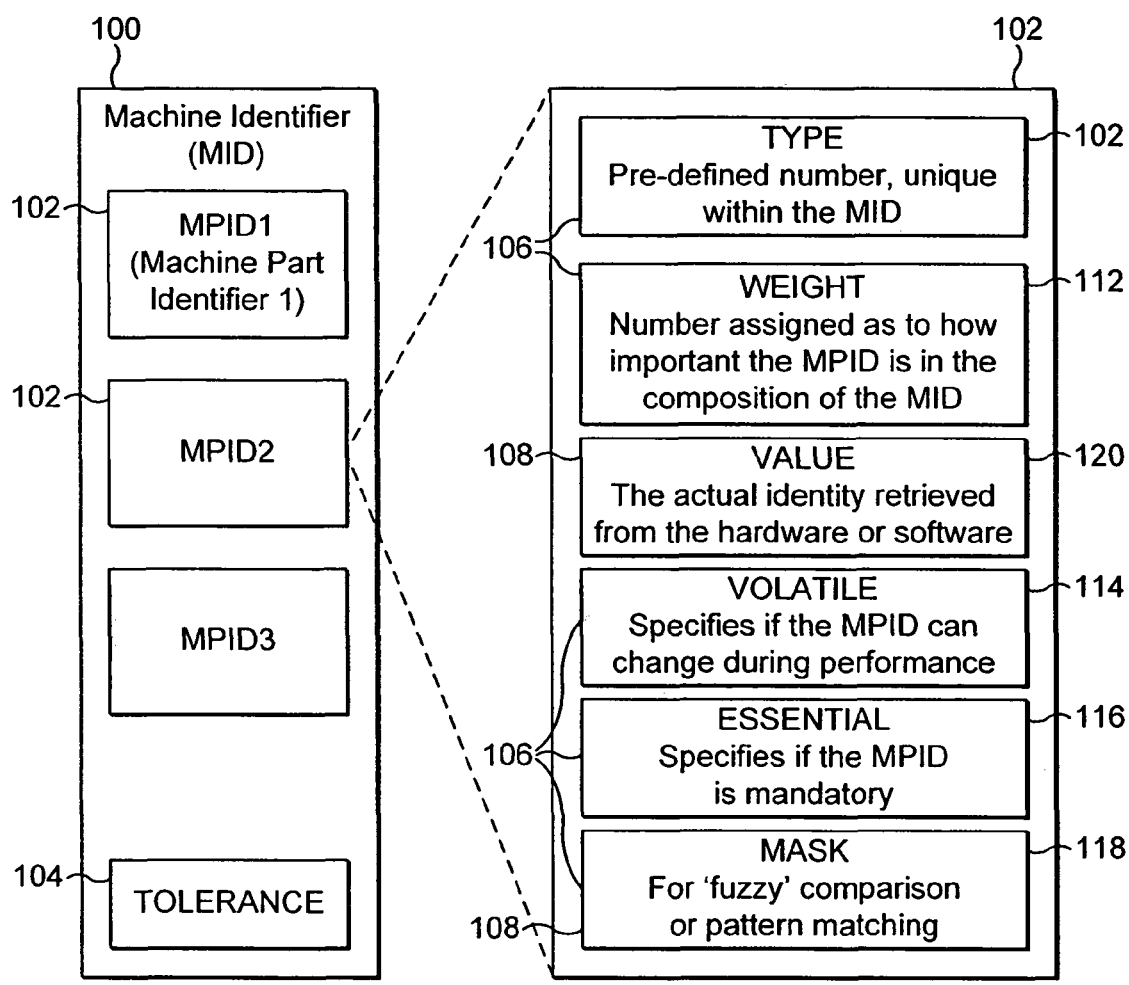
FIG. 2 is a diagrammatic view representing a control identity for the computer system of FIG. 1, generated according to the present invention by means of a validator.

Turning now to FIG. 2, the contents of the unique MID for a particular component 52 and a given platform for the computer system will be described. According to the particular platform concerned, certain hardware devices or software applications of the computer system will be essential to the operation of the component 52; certain devices or applications of the computer system will have greater importance or significance than others; and certain devices or applications of the computer system may be subject to change during performance while others will remain set.

Accordingly, the validator program 56 is arranged to generate an MID 100 for the combination of the component 52 and the instant configuration of the computer system on a given platform by assigning a set of element identities 102 to the various categories of hardware device and software application required by the component 52 and to be found in the computer system. These element identities 102 are designated in the following description as machine part identities (MPID1, MPID2 etc.). The validator program 56 also assigns a tolerance value 104 to the set of MPIDs 102.

The set of MPIDs 102 effectively comprise a list of machine parts from the component manufacturer. On some platforms the list will be relatively long, while on others it will be relatively short. Examples for three different platforms are given below:
Windows
MPID_SYSTEM
MPID_HARDISK
MPID_NETWORK
MPID_INTERNET
MPID_BIOS
MPID_MEMORY
MPID_CPU
MPID_DONGLE
MPID_PUBLISHER
Macintosh
MPID_SYSTEM
MPID_HARDISK
MPID_NETWORK
MPID_INTERNET
MPID_MEMORY
MPID_CPU
MPID_DONGLE
MPID_PUBLISHER
Linux
MPID_SYSTEM
MPID_NETWORK
MPID_DONGLE
MPID_PUBLISHER The validator program 56 determines each MPID 102 by causing the CPU 12 first to interrogate a new component 52 that has been loaded onto the computer 10 to establish what configuration of system is required for the component 52 to operate. This is the binding configuration. More particularly, the CPU 12 establishes the types of device and application needed, their importance, whether or not they may change during performance and whether or not they are essential. The validator program 56 then assigns a set of validation identifiers 106 to each type of device or application required. Such identifiers may be supplied directly by the component or they may be default values included in the validator program 56. Next, under the control of the validator program 56, the CPU 12 also interrogates the computer system to establish whether the relevant type of device or application is present and, if so, assigns a specific identification value or values 108 to that category of device or application, and includes the identification value(s) 108 with the set of identifiers 106.

More specifically, the set of validation identifiers 106 includes a type value 110 indicating the category of device or application; a weight value 112 indicating the significance of the category to the component 52; a volatility identifier 114 indicating whether or not the device or application may change during performance; and an essentiality identifier 116 indicating whether the category of device or application is mandatory or optional in order for the component 52 to be able to run on the computer system. The set of identifiers 106 also includes a mask identifier 118 indicating whether or not fuzzy comparison or pattern matching is permissible for the component requirements.

In addition, the specific identification values 108 obtained from the computer system include an identity value 120, such as the part or serial number, for the respective category of device or application. If fuzzy comparison is indicated to be allowable by the particular component 52, then a mask value 122 is included for the group of elements concerned. For example, in the case of an internet address (IP address) a mask value of 198.168.0.* would encompass any IP address within the range from 198.168.0.0 to 198.168.0.255.

In this way, each category of device or application required by the component 52 and present within the computer system is assigned an MPID 102, and the list of MPIDs 102, together with the tolerance value 104, together combine to provide a unique MID 100 for binding the component 52 to the instant configuration of the computer system on a particular platform.

As stated, the MID 100 for binding the component 52 to a given computer system may be different on different platforms. For example, Table 1 below shows how MPID_SYSTEM and MPID_HARDDISK may be different on the three platforms, Windows, Macintosh and Linux. As indicated, MPID_SYSTEM has the maximum weight value on Macintosh because the system and the machine are integrally associated together, and the computer serial number is globally unique and difficult to modify by the user, whereas on Windows and Linux modifications are readily possible. Likewise, for MPID_HARDDISK, Windows is assigned the maximum weight value because the disk serial number is globally unique and very difficult to modify. By contrast, for Macintosh, the weight value is only 4 because the volume serial number can easily be changed and the disk size is not unique. No identity value is available for Linux for MPID_HARDDISK so a hard disk is not included in the set of MPIDs.

TABLE 1

| | WINDOWS | | MACINTOSH | | LINUX | |
|---|---|---|---|---|---|---|
| | Weight Value | Identity Value | Weight Value | Identity Value | Weight Value | Identity Value |
| MPID_SYSTEM | 5 | Computer name | 10 | Computer serial no. | 5 | Hostid |
| MPID_HARDDISK | 10 | Serial no. | 4 | Volume serial no. + disk size | N/a | N/a |

On each occasion that the component 52 is loaded, the validator program 56 makes the same check to establish a new set of MPIDs 102 and a new MID 100. Furthermore, if the configuration of the component has been updated in the meantime, then the validator program 56 may receive a different set of validation identifiers 106 from the component for determining the relevant MPID 102, and may thus establish a new MID 100 whether or not the configuration of the computer system has changed.

The initial steps of the validation program 56 for establishing the binding configuration and for determining the MID 100 will now be described with reference firstly to FIG. 3 and secondly to FIG. 4.

Figure 3:
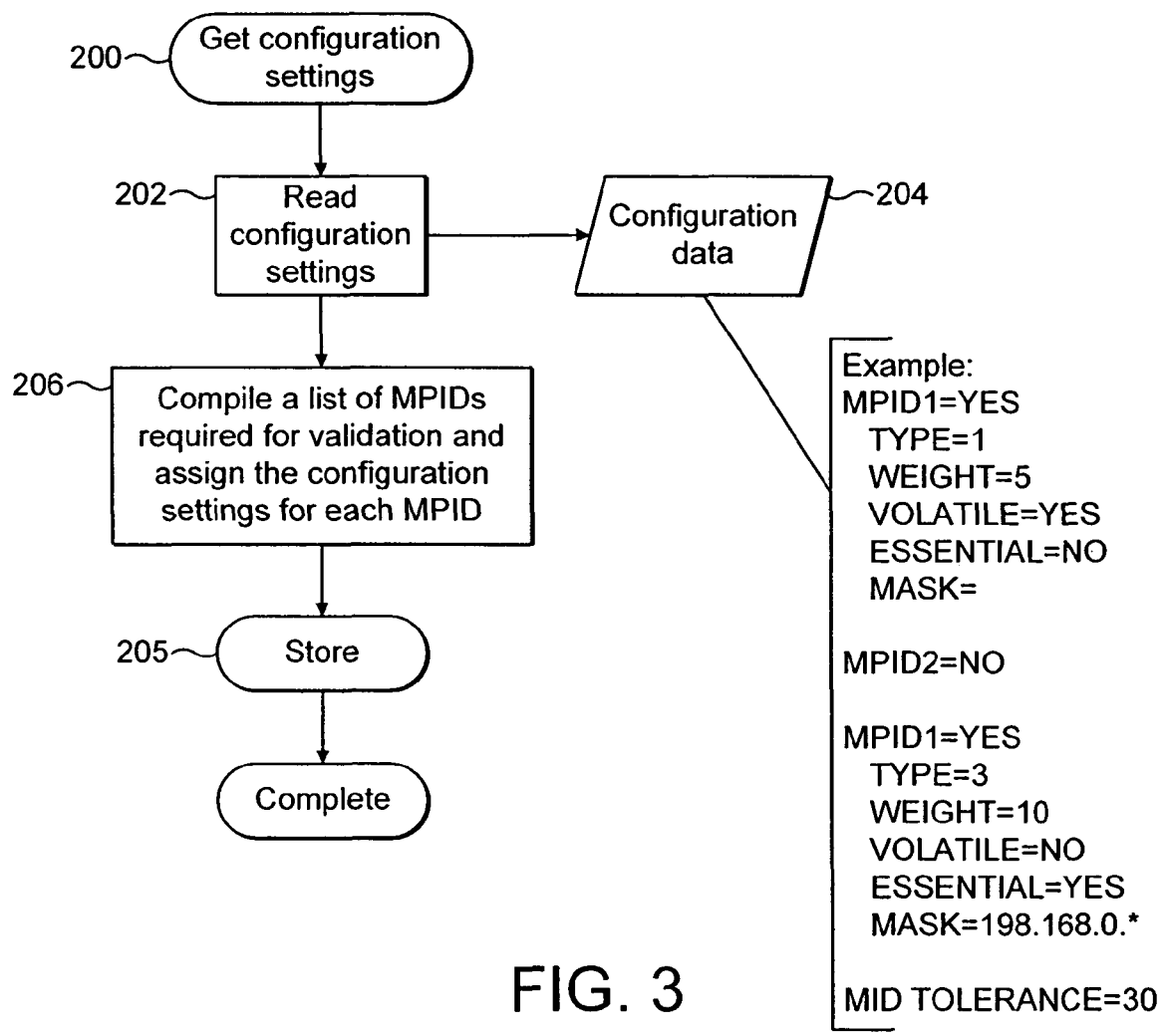
FIG. 3 is a flow chart representing a process of the validator for establishing a binding configuration on first installing a new component within the computer system.

Referring to FIG. 3, the loading of a new component 52 into the computer system by way of a CD ROM inserted into the CD ROM drive 30, by way of a network via the network interface card 34 or by way of one of the computer application libraries 50 alerts the CPU 12 to initiate the validator algorithm. This is illustrated as step 200, in which the algorithm instructs the CPU 12 to initiate the process for obtaining the relevant binding configuration from the newly loaded component 52. In step 202, the CPU 12 is instructed to obtain the configuration data appropriate to the component 52 and to the relevant platform for the computer system, ie to obtain the validation identifiers 106 for each of the required computer hardware devices or software applications. The component 52 responds by supplying the configuration data 62 from the encrypted file 64 in step 204.

An example is given according to which at least one hardware device or software application of type value 1, which will eventually yield the identity MPID1, is required; no device or application of type value 2, which would eventually yield the identity MPID2, is required; and at least one device or application of type value 3, which will eventually yield the identity MPID3, is required. The component 52 further supplies data to indicate that the volatility identifier 114 for MPID1 shows a "yes" meaning that this category of device or application may be volatile; the essentiality identifier 116 is a "no" meaning the category is not essential; and the weighting value for the category is 5. Likewise, the validation identifiers 106 for MPID3 show that this category of device or application is not volatile but is essential and has a weighting of 10. In addition, the category that will yield MPID3 admits of fuzzy comparison or pattern matching.

The validator algorithm further establishes in step 204 by interrogation of the component 52 that a tolerance value 104 of 30 should be established for the MID 100.

Such configuration data having been read in step 202, the validator algorithm proceeds to step 206 and compiles a list of the categories of device or application required to be found in the computer system for validation for the particular component 52 and assigns to each such device the configuration settings read in step 202.

The validation list compiled in step 206 is placed in the memory 54 in step 208, and this completes the initial stage of the validation process in which the binding configuration for the particular component 52 is established.

Figure 4:
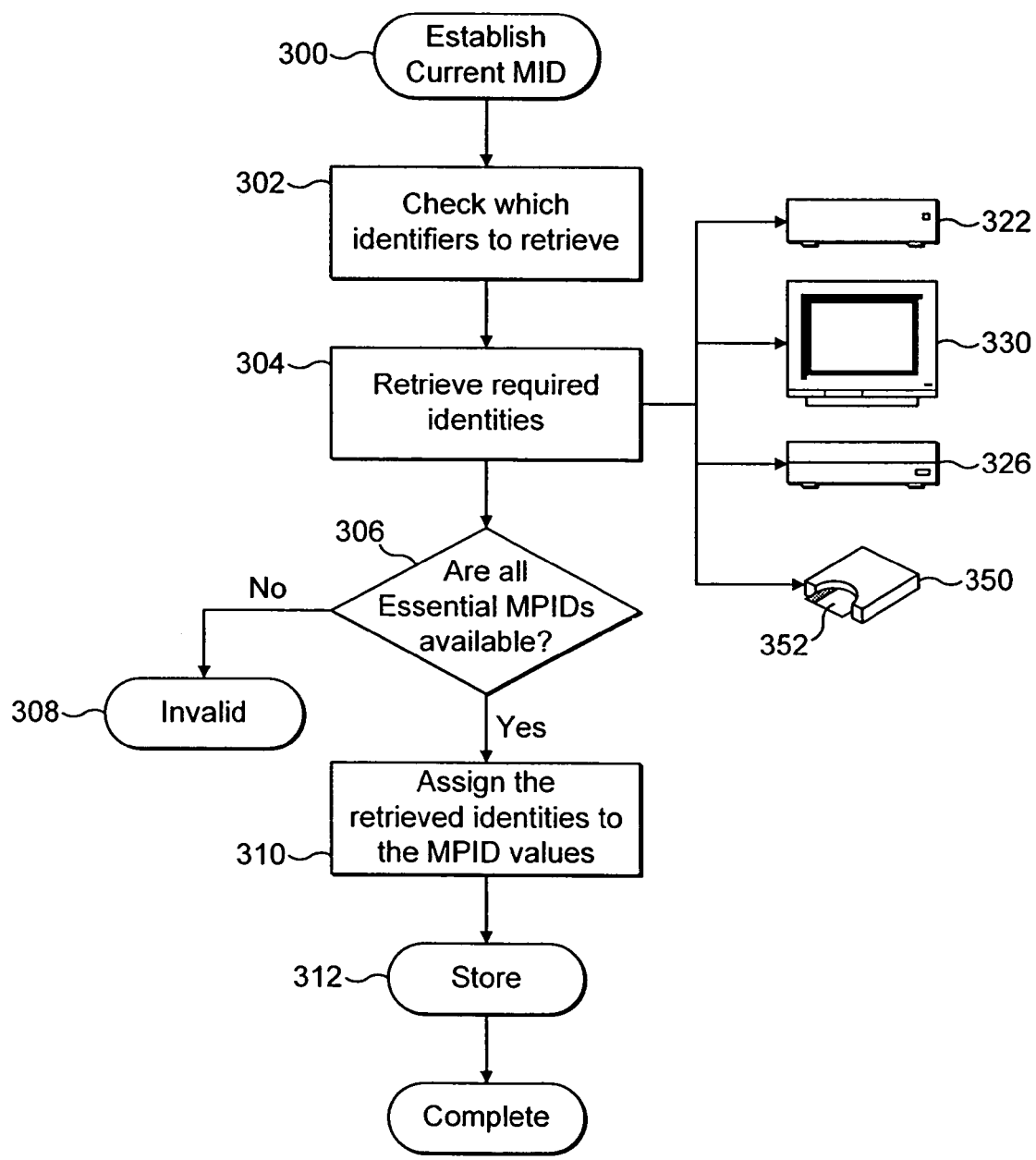
FIG. 4 is a flow chart representing a process of the validator for generating the control identity based on the binding configuration obtained by means of validation process of FIG. 3.

The validator program 56 next proceeds to establish an MID 100 for the platform by means of the process shown in FIG. 4.

In step 300, the CPU 12 retrieves the validation list stored in the memory 54, and in step 302 the CPU 12 checks which categories of computer device or application are required for this binding configuration. Having established which categories are needed, the validation process checks the computer system in step 304 to establish identities for each of the required computer devices or applications within the computer system. For example, the computer system establishes that the binding configuration requires a hard disk drive 322 or a software application stored on the hard disk drive 322, and interrogates the system to obtain an identity value for this device or application. The identity value may be the serial number. Likewise, by way of example, the validation process may have ascertained from step 302 that the component 52 requires a display 330, as well as a CD ROM drive 30, or a software application on a disk within the CD ROM drive 326, and an expansion slot or expansion card, represented by the reference numerals 350 and 352 respectively in FIG. 4. In each case, the CPU 12 retrieves an identity value 120, such as the serial number, for the relevant device or application in step 304.

The validation process then proceeds to step 306 and enquires whether step 304 established that all the essential computer devices or applications were available within the computer system. If the answer is "no", the validation process proceeds to step 308 and declares the validation invalid because a required device or application is not available. In this instance, the validation process instructs the CPU 12 to prevent the component 52 from operating. On the other hand, if step 306 established that all the essential computer devices or applications are available, then the process proceeds to step 310 and assigns the identity values 120 retrieved in step 304 to the configuration settings already stored for the MPIDs 102 in the memory 54. A complete set of MPIDs 102 and a tolerance value 104 are now available, and this constitutes the MID 100 for the relevant component 52. Such MID 100 is stored in the storage facility 58 in step 312, and this completes the second stage of the validation process. The component 52 can now be run on the computer system.

Figure 5:
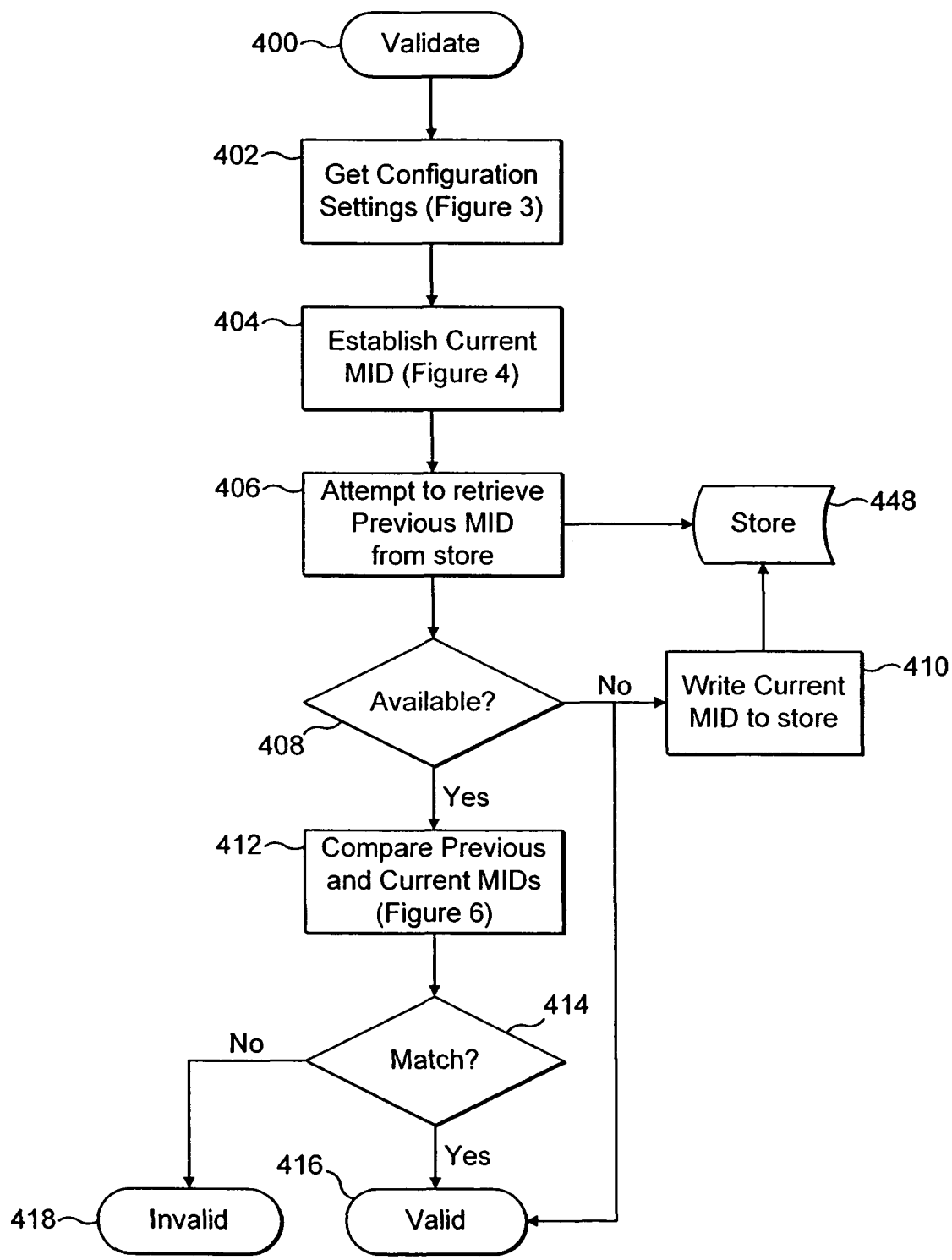
FIG. 5 is a flow chart representing a process of the validator for verifying whether a given component is to be permitted to operate within the computer system or not.

Subsequently, each time that the component 52 is run on the computer system, a binding validation check is carried out to establish whether the component 52 still validly matches the computer system and vice versa. This process is illustrated in FIG. 5.

The validation check is initiated when the component 52 is reloaded or installed in the computer system, at which point the validation program 56 instructs the CPU 12 to instigate a validation check. This is shown as step 400.

In step 402, the validation program prompts the CPU 12 to interrogate the component 52 to obtain a new binding configuration as described with reference to FIG. 3. The validation process then proceeds to step 404, in which the CPU 12 establishes identity values for all of the available computer devices or applications within the computer system and assigns these to the MPIDs, as described with reference to FIG. 4. A new current MID 100 has now been established. The validation check process now proceeds to step 406, in which the CPU 12 interrogates the storage facility 58 to enquire whether a previous MID 100 is contained in the store, as a result of a previous implementation of the validation process steps described with reference to FIGS. 3 and 4. In step 408, the CPU 12 asks if a previous MID 100 is available and, if the answer is "no", then the CPU 12 writes the current MID 100 to the storage facility 58 in step 410. On the other hand, if the answer to the enquiry of step 408 is "yes", the validation check process proceeds to step 412 and compares the previous MID 100 with the current MID 100 in a sub-routine described with reference to FIG. 6.

In step 414, the validation check process enquires whether there is a match between the previous MID 100 and the current MID 100 within the tolerance value specified in the binding configuration. If the answer is "yes", then the validation check is assumed to be valid as shown in step 416, and the CPU 12 is instructed to allow the component 52 to operate. On the other hand, if the outcome of step 414 is a "no", then the validation check is presumed to be invalid and the CPU 12 is instructed to prevent the component 52 from operating.

Figure 6:
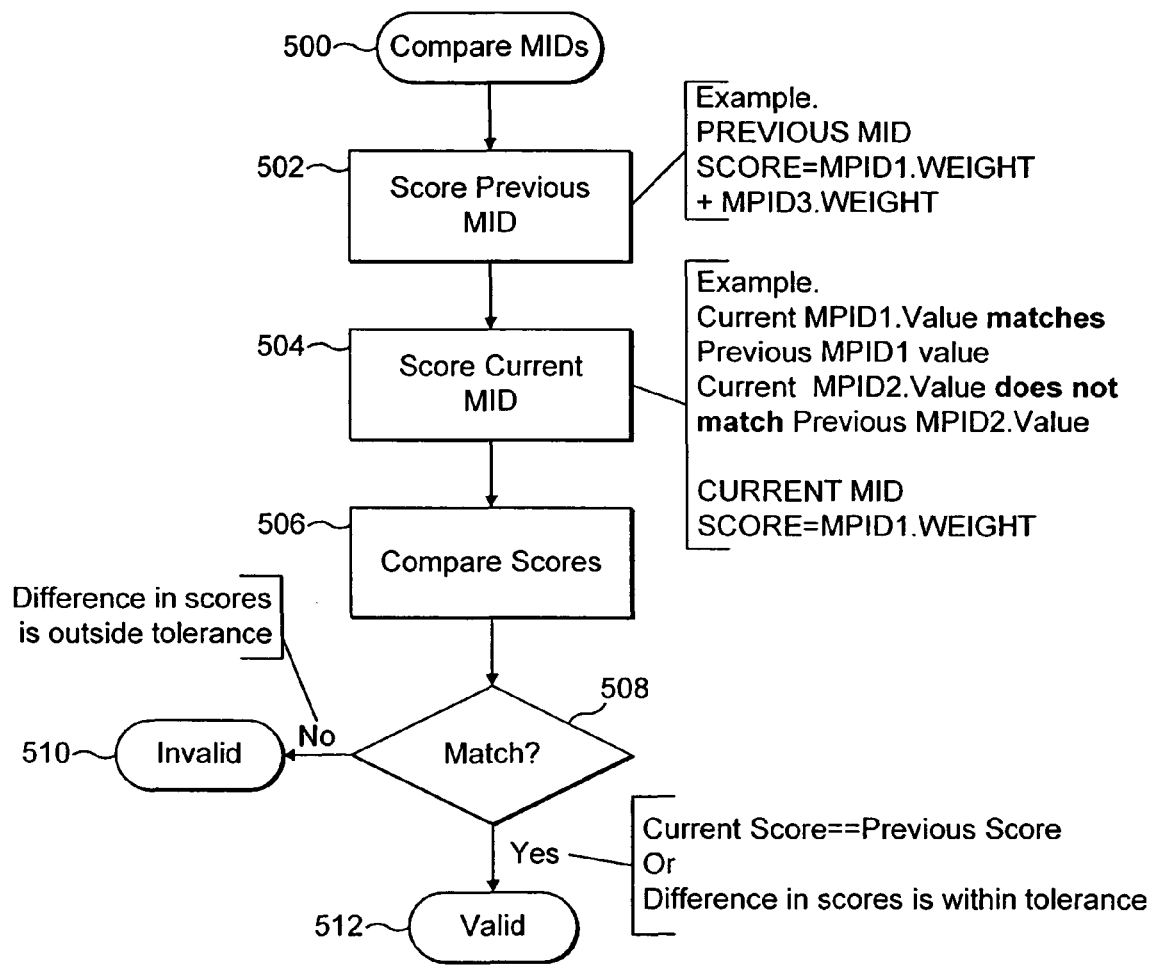
FIG. 6 is a flow chart representing a sub-routine in the process illustrated in FIG. 5, in which a comparison is made between a current control identity and a previous control identity.

Turning now to FIG. 6, the sub-routine for comparing a current MID 100 with a previous MID 100, as mentioned with reference to step 412 in FIG. 5, will be described. The sub-routine starts with step 500, in which the CPU 12 is instructed to compare the two MIDs 100. In step 502, the CPU 12 establishes a score for the previous MID 100, for example either by retrieving a previously calculated score from storage or by newly calculating a score for the previous MID 100. On the first occasion that a score is established, the MID 100 will be the initial MID 100 obtained when the component 52 is first loaded into the computer system, and the score may be calculated by summing the weights assigned to each of the MPIDs 102 of the initial MID 100.

The establishment of a score for the initial MID 100 is illustrated in Table 2 below.

TABLE 2

| MPID Availability | Specified to be mandatory | Specified to be optional |
| --- | --- | --- |
| Available | Add weight to the score | Add weight to the score |
| Not available | Invalidate | Don't add weight to the score [The expression "don't add weight to the score" signifies that the current value will be stored for future use.] |

The validation check process now proceeds to step 504, in which a score is allocated to the current MID 100, for example by summing the weight values 112 for each of the designated computer devices or applications subject to various rules. Under these rules, the CPU 12 first checks whether the designated computer devices or applications are the same as the devices or applications designated for the previous MID 100, for example by comparing the type values 110 assigned to each of the categories of device or application. The weight values 112 for the newly available computer devices or applications, and the weight values 112 for those that have been designated whose identity value 120 matches a corresponding identity value 120 in the previous MID 100 (either directly or by means of fuzzy comparison) are summed. If an identity value 120 for an MPID 102 does not match the corresponding value from the previous MID 100, the weight value is not added to the score for the current MID 100; and, if an MPID 102 is not available, again the weight value is not added to the score.

This is illustrated in Table 3 below.

TABLE 3

| MPID Availability | Specified to be mandatory | Specified to be optional |
| --- | --- | --- |
| Available now, but wasn't available when calculating the previous MID score | Not possible [If the device or application is mandatory it must have been present previously or there would be no previous score.] | Don't add weight to the score |
| Available now, and was available when calculating the previous MID score, and current MPID value matches the MPID value stored for previous MID | Add weight to the score | Add weight to the score |
| Available now, and was available when calculating the previous MID score, but current MPID value does not match the MPID value stored for the previous MID | Invalidate | Don't add weight to the score |
| Not available now, and wasn't available when calculating the previous MID score | Not possible | Don't add weight to the score |
| Not available now, but was available when calculating the previous MID score | Invalidate | Don't add weight to the score |

Having now established a score for the previous MID 100 in step 502 and the score for the current MID 100 in step 504, the validation check process compares the two scores in step 506. In step 508, the CPU 12 asks whether there is a match between the two scores. A match would mean either that the scores are equal, or that the difference between them is within the set tolerance level signifying that no more than normal changes in the computer system have taken place. If the answer is "no", the validation check process assumes that the previous MID 100 was calculated on a different machine, and indicates in step 510 that the validation check is invalid and the component 52 is prevented by the CPU 12 from operating. On the other hand, if the answer to the enquiry made in step 508 is "yes", then the validation check process indicates that the check is valid and, in step 512, the CPU 12 is instructed to permit the component 52 to operate. At the same time, the previous MID 100 stored in the storage facility 58 is updated to the new MID 100.

Figure 7:
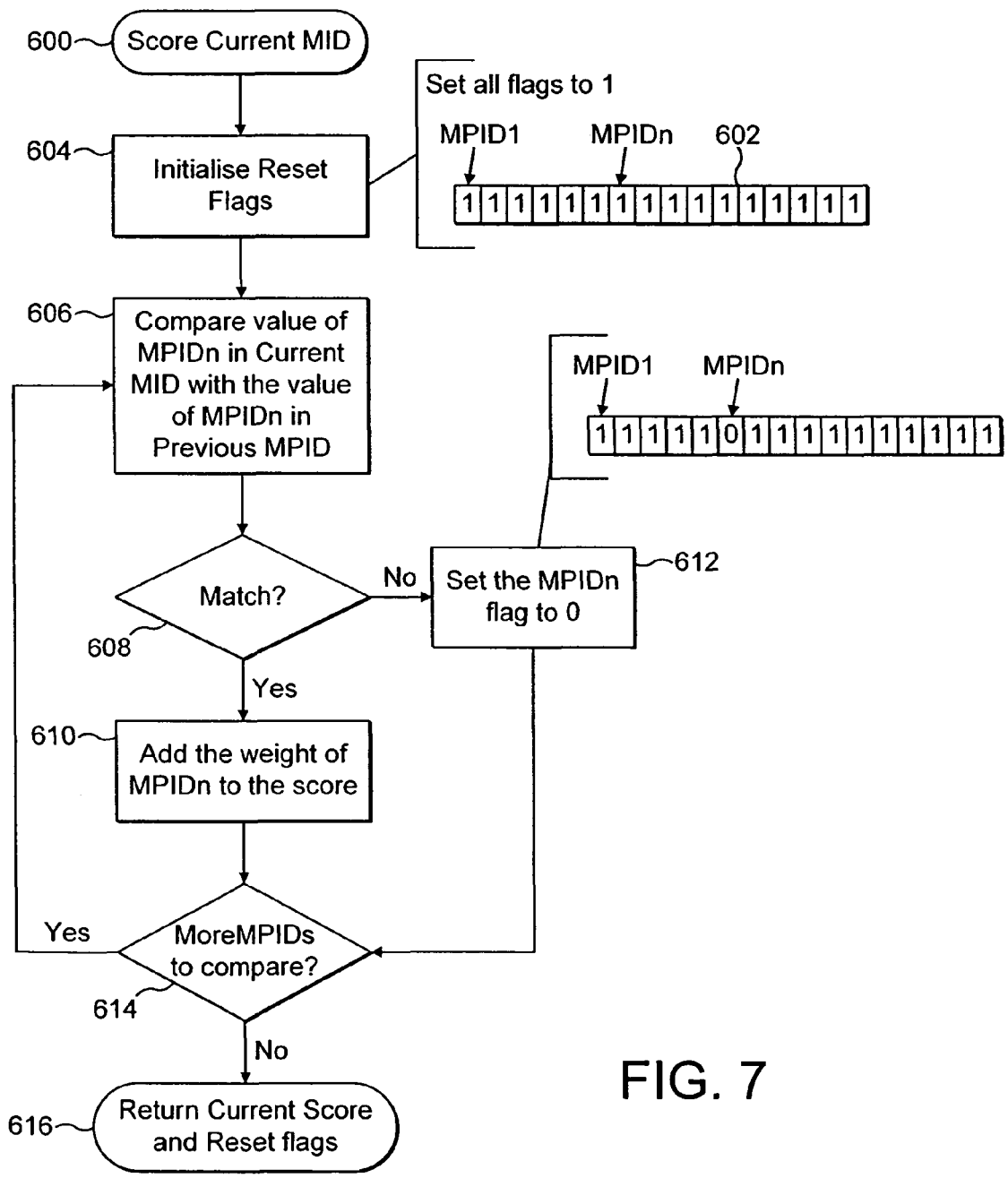
FIG. 7 is a flow chart representing a process of the validator for generating a repair indication in certain circumstances when the binding configuration fails to be established.
Figure 8:
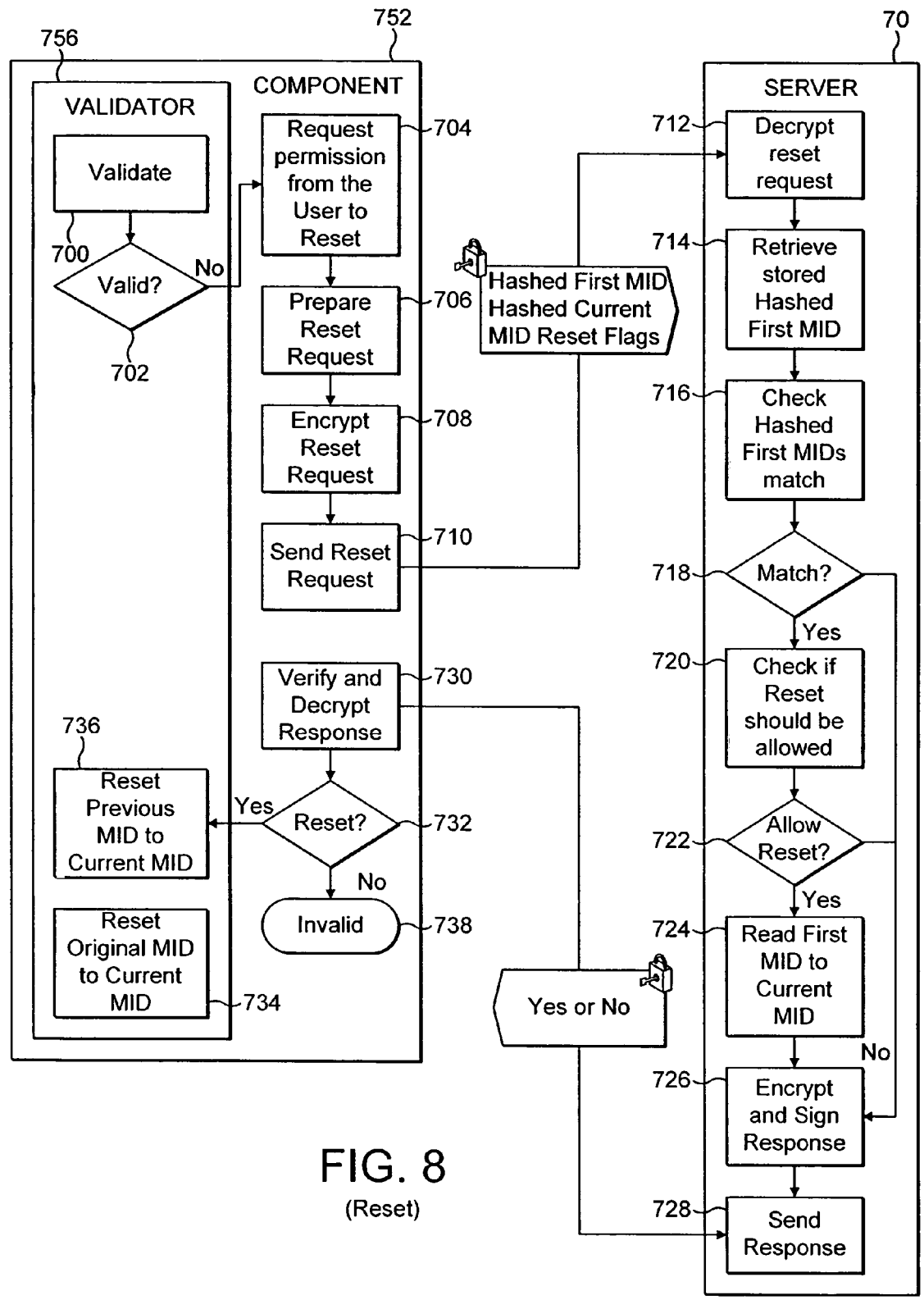
FIG. 8 is a flow chart representing a process of the validator for resetting the binding configuration in response to the repair indication.

There may be occasions when it is necessary or desirable to reset the MID 100 stored in the storage facility 58. Even if the validation check process has indicated that the validation check is invalid, nevertheless a decision may be taken in some circumstances to permit the component 52 to run. For example, the software manufacturer may allow a repair if the request is made within a specified period after activation (eg within six months after activation). Another possibility is when a software manufacturer uses dongles as part of the binding of the software and the dongle changes when the software is upgraded. As dongles are normally essential for binding, this would result in the validation check showing an invalid result even though use of the upgrade is within the terms of the user's license. A further example is when a user's hard disk crashes and the publisher can establish that the user is a genuine customer (possibly through proof of purchase). In all of these instances, resetting of the MID 100 may be permitted. In the event that a resetting facility is provided, the validator module 56 will include software for implementing process steps as shown in FIGS. 7 and 8. These processing steps will now be described.

Firstly, if a resetting facility is provided, step 312 as illustrated in FIG. 4 is modified on the first, and only the first, occasion that the MID 100 is generated. In this instance, the original MID 100 is not only stored in the storage facility 58 but also a hash of the MID 100 is generated by the CPU 12 and is sent by way of the NIC 34 to the server 70. The hash is employed to ensure that individual MPIDs, and the original binding configuration, are not transmitted to the server 70, for the sake of privacy, and to ensure that a constant length identifier for the computer system is available to the server 70. The original MID 100 then remains stored in the storage facility 58, and the hash MID then remains stored in the server 70, for future recovery in the event that resetting may be required.

Secondly, if a resetting facility is provided, step 504 as illustrated in FIG. 6 is modified to include the sub-routine shown in FIG. 7, in order to establish a set of repair flags associated with the current MID 100 for indicating the location where repair may be necessary in the event that a repair decision is taken. The sub-routine of FIG. 7 will now be described.

Whilst the score of the current MID 100 is being calculated in step 504, the validation process issues an instruction in step 600 to initialize a set of repair flags. This set is an N-bit number 602, in which each bit represents a selected MPID 102 and in which each bit is initially set to a "1" representing an operational MPID 102. In the present instance, the set of repair flags is a 16 bit number covering the possibility of 16 MPIDs 102 in the MID. However, the length can be varied as necessary. In response to the instruction issued in step 600, the validation process proceeds to step 604 and initializes the set of repair flags by setting each bit of the N-bit number to a "1".

Next, the validation process proceeds to step 606, in which the identity value 120 of each MPID in the current MID 100 is compared with the identity value 120 of the corresponding MPID in the previous MPID 100. For each such MPID 102, an enquiry is made in step 608 as to whether the two identity values match. If the answer is a "yes", then in step 610 the weight value 112 of the respective MPID 102 is added to the score for the current MID 100. On the other hand, if the answer is a "no", then in step 612 the bit value of the set of repair flags 602 representing the relevant MPID 102 is set to the value "zero". This signifies that there is a fault in the relevant MPID 102. Following step 610 or step 612, the validation process proceeds to step 614 and enquires whether the current MID 100 includes further MPIDs 102 to be compared with their counterparts in the previous MID 100. If the answer is "yes", the process reverts to step 606 again. However, if the answer is a "no", the sub routine terminates in step 616 by issuing the score for the current MID 100, together with a set of repair flags 602.

Subsequently, the software process for resetting follows the steps shown in FIG. 8. After the component 52 has been reloaded within the computer system and the validator module 56 has completed the validation check as already described with reference to FIG. 5 and as represented by step 700 in FIG. 8, the validator module 56 enquires by way of the CPU 12 in step 702 whether the outcome of the validation check was valid or invalid. If the answer is "no", the process proceeds to a sub-routine in the component beginning with step 704. Here, the CPU 12 is instructed to inform the user that the check yielded an invalid result and to enquire of the user whether or not a repair request should be made. The CPU 12 may verify this through consultation, for example, directly with the user by way of a pop-up message on the display 22. If the answer is "yes", a repair request is generated in step 706. The repair request will include a hash of the original MID 100 retrieved from the storage facility 58, a hash of the current MID 100, and the repair flags 602 generated as a result of the process of FIG. 7. The repair request is then encrypted and sent to the server 70 in steps 708 and 710.

The server 70 receives and decrypts the repair request in step 712 and, in step 714 retrieves the hashed original MID 100 that has been stored in the server 70 since the component 52 was first used. The hash of the original MID 100 from the computer 10 and the hashed original MID 100 from the server 70 are then compared in step 716, and the server 70 enquires in step 718 whether they match. If the answer is "yes", the server proceeds to step 720 and processes the repair flags 602 received by the server 70 in order to consider where repair is needed and whether a repair should be permitted. The server then proceeds to step 722 and takes a decision, based on the outcome of step 720 and on internally stored regulations for the component 52, as to whether to permit a repair. If the answer is "yes", the server 70 in step 724 resets the hashed original MID 100 stored in the server 70 to the hashed current MID 100. The server 70 now proceeds to step 726. If the outcome of either of step 718 or step 722 is a "no", then the server 70 proceeds straight to step 726 without undertaking the processing of steps 720-724, or of step 724, respectively. In step 726, the server 70 encrypts and signs its response to the repair request from the computer 10 and, in step 728, the server 70 transmits the response to the computer system by way of the NIC card 34. The response will include a decision as to whether or not repair is permitted.

In response to the decision transmitted in step 728, the CPU 12 in the computer system in step 730 authenticates the server 70 and decrypts the response. Assuming that the server is authenticated, the CPU 12 proceeds to step 732 and enquires whether a repair is to be made. If the answer is a "yes", the validator process resets the previous MID 100 stored in the storage facility 58 to the current MID 100 in step 734 and permits the component 52 to be reloaded and run. Finally, the CPU 12 proceeds to step 736 and also replaces the original MID 100 in the storage facility 58 with the current MID 100.

In the event that the answer is a "no", either because this is the decision included in the response transmitted in step 728 or because the server is not authenticated in step 730 or because of a communication breakdown, the process terminates in step 738 with an "invalid" indication that prevents the component from operating.

What is claimed is:

1. A system, comprising:
   a component of a computer system, the component including a hardware device and a software application;

a processor;

a validator module for controlling the processor to generate a control identity, the control identity for binding together the component and the computer system; and a store for storing the control identity;

wherein the validator module is arranged to define a binding configuration for the component, the binding configuration representing a weighted combination of a set of hardware elements and a set of software elements needed within the computer system for operation of the component, and is arranged to prompt the processor to establish whether instances of the hardware elements and software elements are present in the computer system;

wherein the validator module assigns to each category of element that is established to be present an identity value and adds the identity value to data representing the binding configuration to define the control identity;

wherein the binding configuration comprises a list of identifiers for each category of element, wherein the list of identifiers includes a weight value representing a level of difficulty to modify the category of elements, a volatility indicator representing an indication as to whether elements in the category may change during performance, and an essentiality indicator representing an essentiality of the category of elements for operation of the component, wherein the essentiality represents whether the component is operable without the category of elements;

wherein the validator module causes the control identity to be transferred to the store;

and wherein the validator module is arranged to cause the processor to generate a new control identity on each occasion that the component is loaded into the computer system;

compare the new control identity with the previous the control identity for establishing whether the component may be permitted to operate in the computer system; and permit the component to operate in the computer system upon determining that elements identified as essential to the operability of the component are present in the computer system.

2. A system according to claim 1 in which the binding configuration is determined according to a selected platform.

3. A system according to claim 1 in which the list of identifiers further comprises: a type number representing the category of elements and a masking value representing a general indicator for respective ones of a plurality of elements in the category.

4. A system according to claim 1 in which the combination of the binding configuration and the identity value for each category of element comprises a category identity, and in which the control identity comprises a list of the category identities.

5. A system according to claim 1 further comprising signaling means for communicating the presence of the component to the processor and for initiating the generation of a control identity when the component is loaded into the computer system.

6. A system according to claim 1 in which the validator module converts each control identity into a score value for comparing the same.

7. A system according to claim 1 in which the validator module comprises a software algorithm.

8. A system according to claim 1 in which the store is a secure store.

9. A system according to claim 1 further comprising means for issuing a repair request and means for resetting the control identity in response to the repair request.

10. A system, comprising:

a component of a computer system, the component including a hardware device and a software application;

a processor;

a validator module for controlling the processor to generate a control identity, the control identity for binding together the component and the computer system; and a store for storing the control identity;

the validator module comprising:

means for defining a binding configuration for the component, the binding configuration representing a weighted combination of a set of hardware elements and a set of software elements needed within the computer system for operation of the component;

means for establishing whether instances of the hardware elements and software elements are present in the computer system;

means for assigning to each category of element that is established to be present an identity value;

means for adding the identity value to data representing the binding configuration to define the control identity;

wherein the binding configuration comprises a list of identifiers for each category of element, wherein the list of identifiers includes a weight value representing a level of difficulty to modify the category of elements, a volatility indicator representing an indication as to whether elements in the category may change during performance, and an essentiality indicator representing an essentiality of the category of elements for operation of the component, wherein the essentiality represents whether the component is operable without the category of elements;

means for causing the control identity to be transferred to the store;

means for generating a new control identity on each occasion that the component is loaded into the computer system;

means for comparing the new control identity with the previous the control identity for establishing whether the component may be permitted to operate in the computer system; and means for permitting the component to operate in the computer system upon determining that elements identified as essential to the operability of the component are present in the computer system.

11. A non-transitory computer readable medium bearing a program, the program comprising:

code for generating a control identity for binding together a component of a computer system and the computer system, the component including a hardware device and a software application;

code for defining a binding configuration for the component, the binding configuration representing a weighted combination of a set of hardware elements and a set of software elements needed within the computer system for operation of the component;

code for establishing whether instances of the hardware elements and software elements are present in the computer system;

code for assigning to each category of element that is established to be present an identity value;

code for adding each identity value to data representing the binding configuration to define the control identity;

wherein the binding configuration comprises a list of identifiers for each category of element, wherein the list of identifiers includes a weight value representing a level of difficulty to modify the category of elements, a volatility indicator representing an indication as to whether elements in the category may change during performance, and an essentiality indicator representing an essentiality of the category of elements for operation of the component, wherein the essentiality represents whether the component is operable without the category of elements;

code for causing the control identity to be transferred to the store;

code for generating a new control identity on each occasion that the component is loaded into the computer system;

code for comparing the new control identity with the previous the control identity for establishing whether the component may be permitted to operate in the computer system; and code for permitting the component to operate in the computer system upon determining that elements identified as essential to the operability of the component are present in the computer system.

12. A computer-implemented method, comprising:

generating a control identity for binding together a component of a computer system and the computer system, the component including a hardware device and a software application;

defining a binding configuration for the component, the binding configuration representing a weighted combination of a set of hardware elements and a set of software elements needed within the computer system for operation of the component;

establishing whether instances of the hardware elements and software elements are present in the computer system;

assigning to each category of element that is established to be present an identity value;

adding the identity value to data representing the binding configuration to define the control identity;

wherein the binding configuration comprises a list of identifiers for each category of element, wherein the list of identifiers includes a weight value representing a level of difficulty to modify the category of elements, a volatility indicator representing an indication as to whether elements in the category may change during performance, and an essentiality indicator representing an essentiality of the category of elements for operation of the component, wherein the essentiality represents whether the component is operable without the category of elements;

storing the control identity;

generating a new control identity on each occasion that the component is loaded into the computer system;

comparing the new control identity with the previous the control identity for establishing whether the component may be permitted to operate in the computer system; and permitting the component to operate in the computer system upon determining that elements identified as essential to the operability of the component are present in the computer system.

13. A computer-implemented method according to claim 12 comprising determining the binding configuration according to a selected platform.

14. A computer-implemented method according to claim 12 wherein the list of identifiers further comprises: a type number representing the category of elements and a masking value representing a general indicator for respective ones of a plurality of elements in the category.

15. A computer-implemented method according to claim 12 in which the combination of the binding configuration and the identity value for each category of element comprises a category identity, and in which the control identity comprises a list of the category identities.

16. A computer-implemented method according to claim 12 further comprising communicating the presence of the component and initiating the generation of the control identity when the component is loaded into the computer system.

17. A computer-implemented method according to claim 12 comprising converting each control identity into a score value for comparing the same.

18. A computer-implemented method according to claim 12 further comprising resetting the control identity in response to a repair request.

\* \* \* \* \*